United States Patent
Rimini et al.

(10) Patent No.: US 11,412,394 B2
(45) Date of Patent: Aug. 9, 2022

(54) RADAR MANAGEMENT BASED ON INTERFERENCE DETECTED OVER AN AIR INTERFACE

(71) Applicant: QUALCOMM Incorporated, San Diego, CA (US)

(72) Inventors: Roberto Rimini, San Diego, CA (US); Eyosias Yoseph Imana, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 16/723,765

(22) Filed: Dec. 20, 2019

(65) Prior Publication Data
US 2021/0195435 A1   Jun. 24, 2021

(51) Int. Cl.
| | |
|---|---|
| *H04W 16/28* | (2009.01) |
| *H04W 24/10* | (2009.01) |
| *H04W 74/08* | (2009.01) |
| *H04B 17/318* | (2015.01) |
| *H04L 5/14* | (2006.01) |
| *H04B 17/336* | (2015.01) |

(52) U.S. Cl.
CPC .......... *H04W 16/28* (2013.01); *H04B 17/318* (2015.01); *H04B 17/336* (2015.01); *H04L 5/1469* (2013.01); *H04W 24/10* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2019/0141692 A1 | 5/2019 | Subramanian et al. | |
| 2019/0200365 A1* | 6/2019 | Sampath | H04B 1/3838 |
| 2019/0222326 A1 | 7/2019 | Dunworth et al. | |
| 2019/0260455 A1* | 8/2019 | Ryu | G06K 9/00664 |
| 2020/0015236 A1* | 1/2020 | Kung | H04B 17/336 |
| 2020/0127907 A1* | 4/2020 | Koo | H04L 43/06 |
| 2021/0152447 A1* | 5/2021 | Yang | H04W 24/02 |
| 2021/0231771 A1* | 7/2021 | Bengtsson | H04B 7/0695 |

FOREIGN PATENT DOCUMENTS

| | | |
|---|---|---|
| WO | 2018210427 A1 | 11/2018 |
| WO | 2019126264 A1 | 6/2019 |

OTHER PUBLICATIONS

International Search Report and Written Opinion—PCT/US2020/065447—ISA/EPO—dated Mar. 24, 2021.

\* cited by examiner

*Primary Examiner* — Scott M Sciacca
(74) *Attorney, Agent, or Firm* — Patterson + Sheridan, L.L.P.

(57) ABSTRACT

Certain aspects of the present disclosure provide techniques for radar management based on interference detected over an air interface. A method that may be performed by a base station (BS) or a user equipment (UE) includes measuring received power at each of a plurality of receive-beams. The method may also include determining whether the measured power received at one or more of the plurality of receive-beams satisfies a threshold condition. If the measured power received at the one or more of the plurality of receive-beams satisfies the threshold condition, the method may also include selecting a directional transmit beam based on a direction of one of the one or more of the plurality of receive-beams that satisfy the threshold condition, and transmitting a radar waveform over the directional transmit beam.

30 Claims, 10 Drawing Sheets

RADAR MANAGEMENT BASED ON INTERFERENCE DETECTED OVER AN AIR INTERFACE

BACKGROUND

Field of the Disclosure

Aspects of the present disclosure relate to wireless communications, and more particularly, to techniques for radar management based on interference detected over an air interface.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include an improved ability to detect an object while maintaining wireless communications between multiple network entities.

Certain aspects provide a method for detecting interference by a network entity. The method generally includes measuring received power at each of a plurality of receive-beams. The method may also include determining whether the measured power received at one or more of the plurality of receive-beams satisfies a threshold condition. If the measured power received at the one or more of the plurality of receive-beams satisfies the threshold condition, the method may also include selecting a directional transmit beam based on a direction of one of the one or more of the plurality of receive-beams that satisfy the threshold condition, and transmitting a radar waveform over the directional transmit beam.

Certain aspects provide a network entity configured to detect interference over an air interface, comprising a memory and a processor, wherein the processor is communicatively coupled to the memory. In certain aspects, the processor is configured to measure received power at each of a plurality of receive-beams. In certain aspects, the processor is configured to determine whether the measured power received at one or more of the plurality of receive-beams satisfies a threshold condition. In certain aspects, if the measured power received at the one or more of the plurality of receive-beams satisfies the threshold condition, the processor is configured to select a directional transmit beam based on a direction of one of the one or more of the plurality of receive-beams that satisfy the threshold condition, and transmit a radar waveform over the directional transmit beam.

Certain aspects provide an apparatus for detecting interference. In some examples, the apparatus includes means for measuring received power at each of a plurality of receive-beams. In some examples, the apparatus includes means for determining whether the measured power received at one or more of the plurality of receive-beams satisfies a threshold condition. In some examples, the apparatus includes means for selecting a directional transmit beam based on a direction of one of the one or more of the plurality of receive-beams that satisfy the threshold condition, and means for transmitting a radar waveform over the directional transmit beam, if the measured power received at the one or more of the plurality of receive-beams satisfies the threshold condition.

A non-transitory computer readable storage medium that stores instructions that when executed by a processor of an apparatus cause the apparatus to perform a method of detecting interference over an air interface. In some examples, the non-transitory computer readable storage medium includes measuring received power at each of a plurality of receive-beams. In some examples, the non-transitory computer readable storage medium includes determining whether the measured power received at one or more of the plurality of receive-beams satisfies a threshold condition. In some examples, the non-transitory computer readable storage medium includes selecting a directional transmit beam based on a direction of one of the one or more of the plurality of receive-beams that satisfy the threshold condition, and transmitting a radar waveform over the directional transmit beam, if the measured power received at the one or more of the plurality of receive-beams satisfies the threshold condition.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
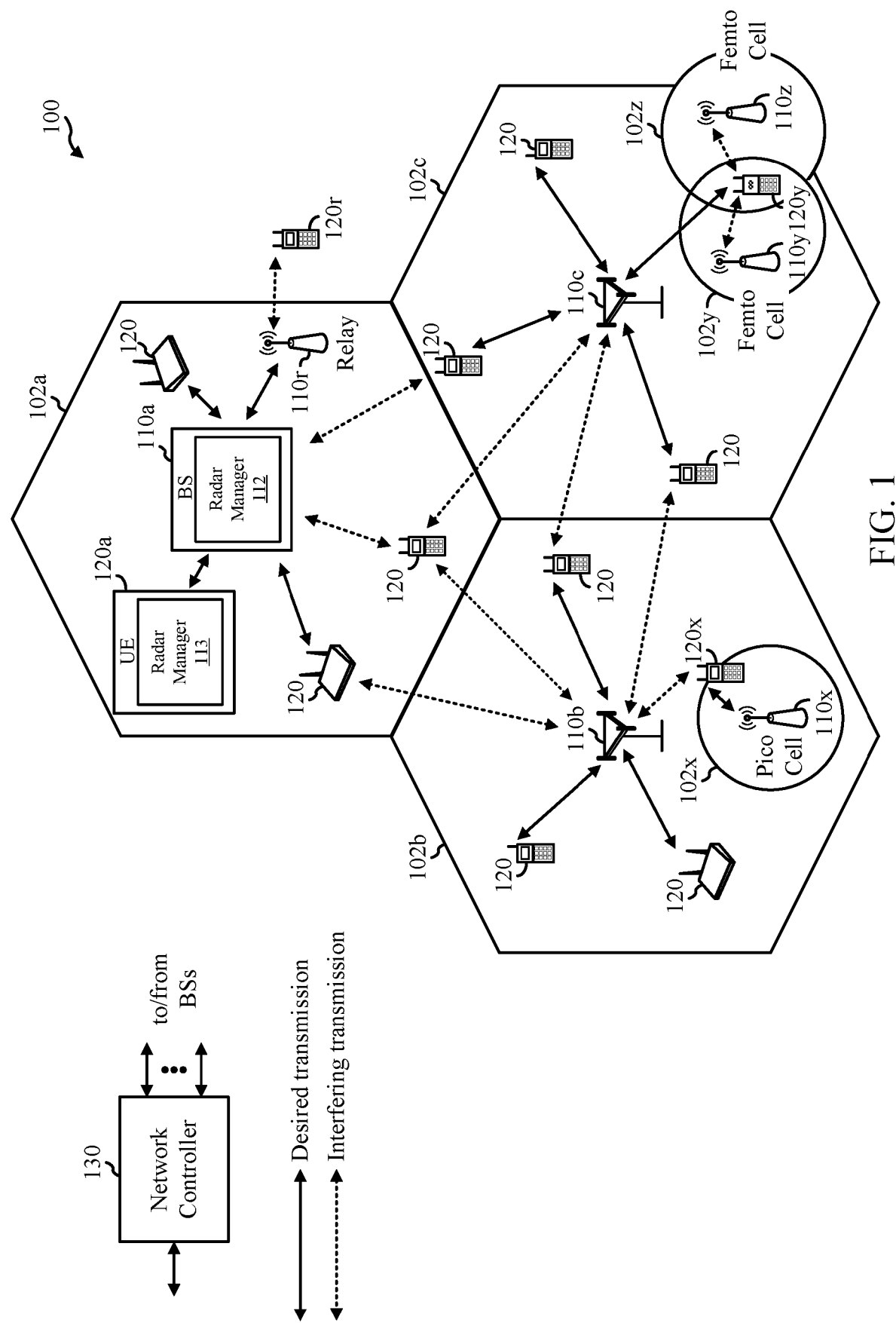
FIG. 1 is a block diagram conceptually illustrating an example telecommunications system, in accordance with certain aspects of the present disclosure.

Aspects of the present disclosure provide apparatus, methods, processing systems, and computer readable mediums for detecting and measuring interference over an air interface (e.g., radio transmission interface for wireless communications), and managing transmission of a radar waveform based on an amount of interference detected. For example, if a network entity measures a relatively high level (e.g., greater than a threshold value) of interference over an air interface, the network entity may determine not to transmit the radar waveform because the radar waveform may jam or interfere with signaling from other network entities. However, if the network entity measures a relatively low level (e.g., less than a threshold value) of interference over an air interface, the network entity may determine to transmit the radar waveform in order to detect whether an object or individual is within a range of the network entity.

In some examples, the network entity receives and measures an amount of power or a rise over thermal (RoT) based on signals received over a plurality of directional receive beams. In some examples, the network entity may include a base station (BS).

The following description provides examples of radar management in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, BSs 110 may be configured for managing radar transmissions. As shown in FIG. 1, the BS 110a includes a radar manager 112. The radar manager 112 may be configured to measure received power at each of a plurality of receive-beams, in accordance with aspects of the present disclosure. In some examples, the radar manager 112 may determine whether the measured power received at one or more of the plurality of receive-beams satisfies a threshold condition. If the measured power received at the one or more of the plurality of receive-beams satisfies the threshold condition, the radar manager 112 may be configured to select a directional transmit beam based on a direction of one of the one or more of the plurality of receive-beams that satisfy the threshold condition, and transmit a radar waveform over the directional transmit beam.

According to certain aspects, the UEs 120 may be configured for managing radar transmissions. As shown in FIG. 1, UE 120a includes a radar manager 113. The radar manager 113 may be configured to measure received power at each of a plurality of receive-beams, in accordance with aspects of the present disclosure. In some examples, the radar manager 113 may determine whether the measured power received at one or more of the plurality of receive-beams satisfies a threshold condition. If the measured power received at the one or more of the plurality of receive-beams satisfies the threshold condition, the radar manager 113 may be configured to select a directional transmit beam based on a direction of one of the one or more of the plurality of receive-beams that satisfy the threshold condition, and transmit a radar waveform over the directional transmit beam.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
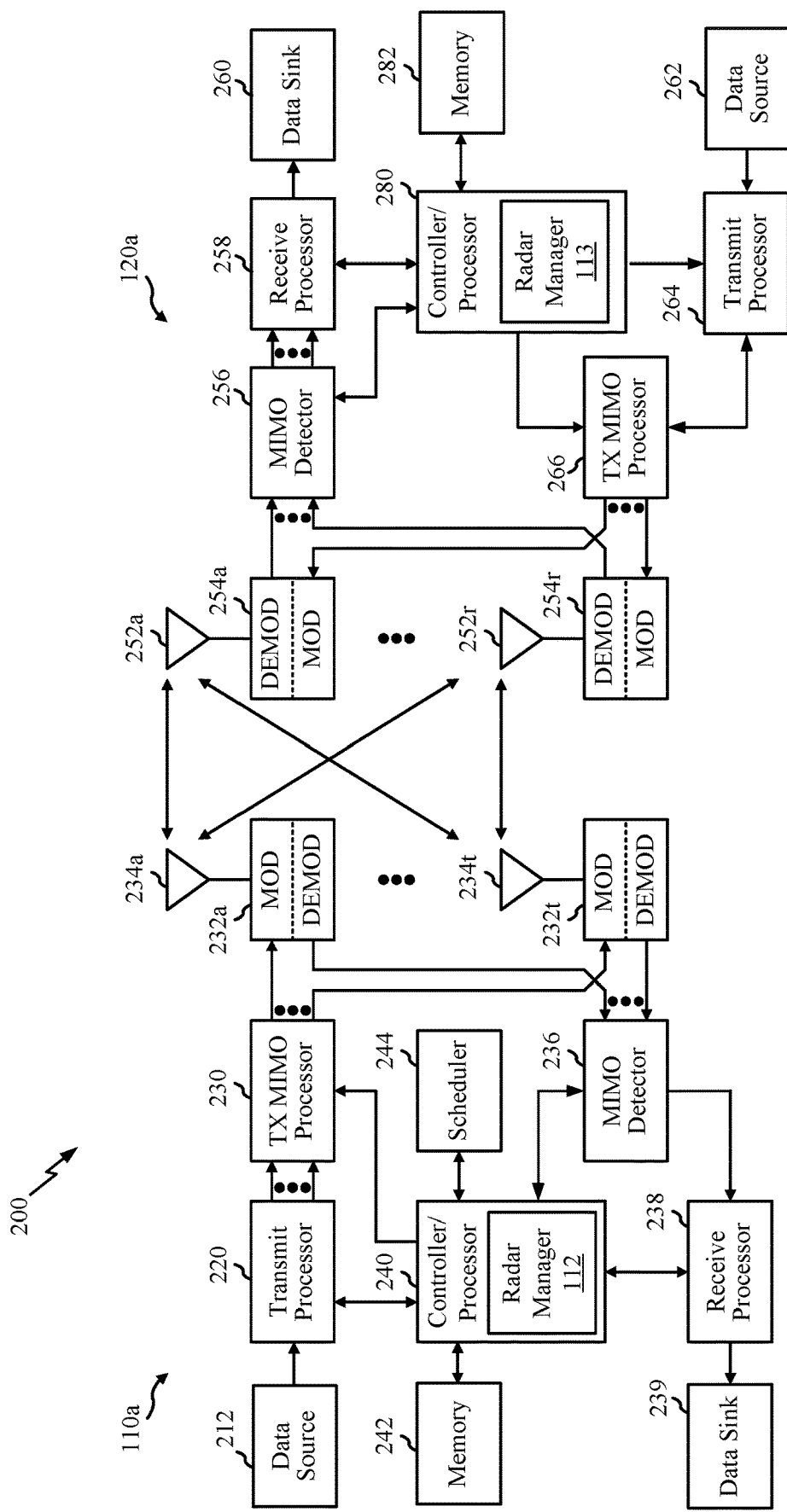
FIG. 2 is a block diagram conceptually illustrating a design of an example a base station (BS) and user equipment (UE), in accordance with certain aspects of the present disclosure.

FIG. 2 illustrates example components 200 of BS 110a and UE 120a (e.g., in the wireless communication network 100 of FIG. 1), which may be used to implement aspects of the present disclosure.

In a MIMO system, the BS 110a and the UE 120a include multiple antennas (234a through 234t and 252a through 252r) to generate a plurality of signal paths between the UE 120a and the BS 110a. The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the DL. The spatially precoded data streams arrive at the UE(s) with different spatial signatures, which enables each of the UE(s) to recover the one or more data streams destined for that UE. On the UL, each UE transmits a spatially precoded data stream, which enables the base station to identify the source of each spatially precoded data stream.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators of transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-

254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

As shown in FIG. 2, the controller/processor 240 of the BS 110a has a radar manager 112 that may be configured for managing radar transmissions from the BS 110a. For example, the radar manager 112 may be configured to measure received power at each of a plurality of receive-beams, in accordance with aspects of the present disclosure. In some examples, the radar manager 112 may determine whether the measured power received at one or more of the plurality of receive-beams satisfies a threshold condition. If the measured power received at the one or more of the plurality of receive-beams satisfies the threshold condition, the radar manager 112 may be configured to select a directional transmit beam based on a direction of one of the one or more of the plurality of receive-beams that satisfy the threshold condition, and transmit a radar waveform over the directional transmit beam.

Similarly, the controller/processor 280 of the UE 120a has a radar manager 113 that may be configured for managing radar transmissions from the UE 120a. For example, the radar manager 113 may be configured to measure received power at each of a plurality of receive-beams, in accordance with aspects of the present disclosure. In some examples, the radar manager 113 may determine whether the measured power received at one or more of the plurality of receive-beams satisfies a threshold condition. If the measured power received at the one or more of the plurality of receive-beams satisfies the threshold condition, the radar manager 113 may be configured to select a directional transmit beam based on a direction of one of the one or more of the plurality of receive-beams that satisfy the threshold condition, and transmit a radar waveform over the directional transmit beam.

Figure 3:
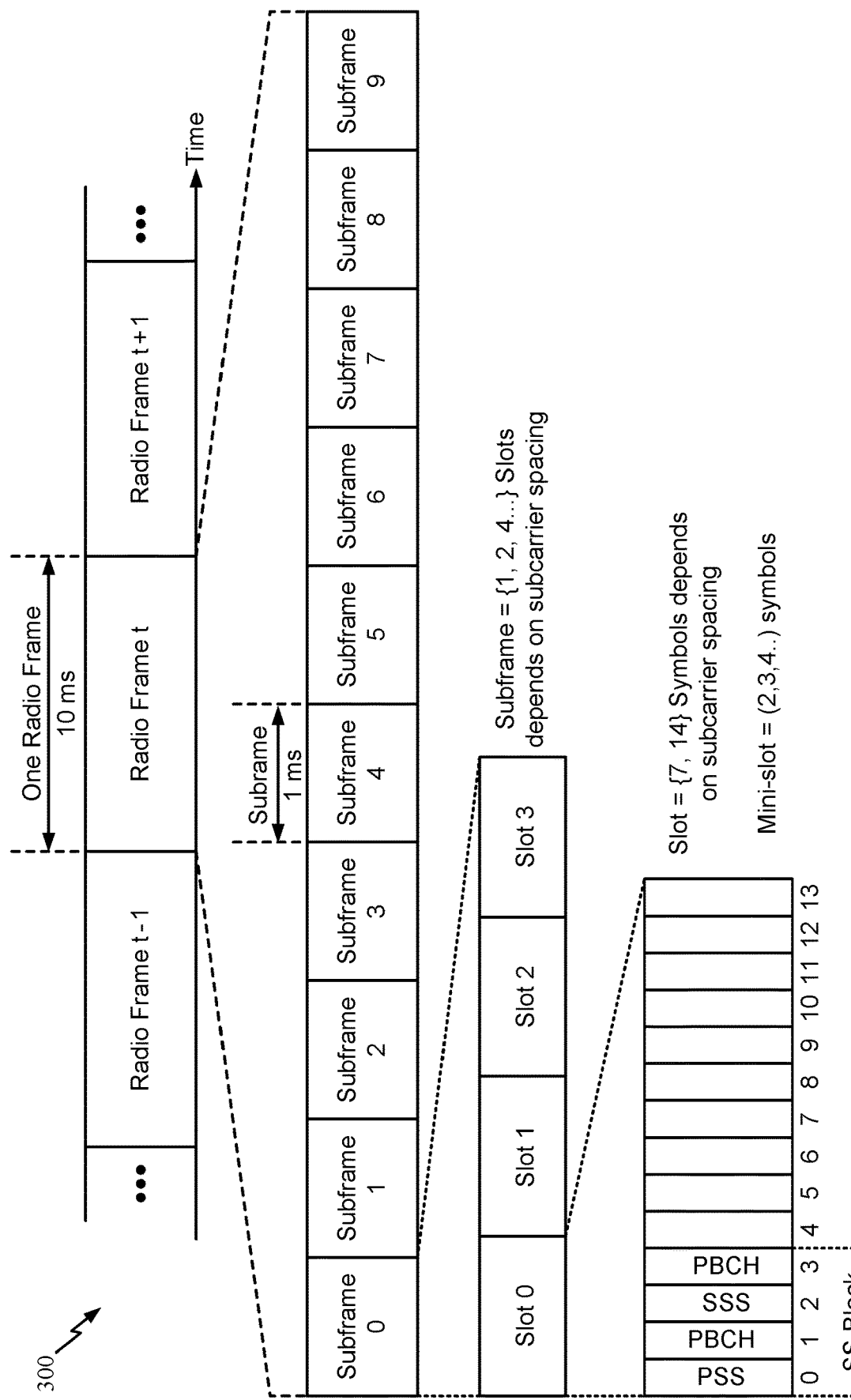
FIG. 3 is a diagram showing an example of a frame format for new radio (NR), in accordance with certain aspects of the present disclosure.

FIG. 3 is a diagram showing an example of a frame format 300 for NR. The transmission timeline for each of a downlink and an uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some examples of wireless communication, an electronic device (e.g., a UE 120 and/or BS 110a) may use a high transmit power to compensate for path loss associated with millimeter wave (mmW) signals. Many of these electronic devices can be physically operated by a user. Such physical proximity presents opportunities for radiation to exceed a given guideline, such as a maximum permitted exposure (MPE) limit as determined by the Federal Communications Commission (FCC). Because of these issues, it is advantageous to enable devices to detect proximity of objects (e.g., the user).

Some proximity-detection techniques may use a dedicated sensor to detect the user, such as a camera, an infrared sensor, or a radar sensor. However, many such sensors are bulky and expensive. Furthermore, a single electronic device can include multiple antennas that are positioned on different surfaces (e.g., on a top, a bottom, or opposite sides). To account for each of these antennas, multiple cameras or sensors may need to be installed near each of these antennas, which further increase cost and size of the electronic device.

Thus, in some examples, the electronic device may use a wireless transceiver to perform both radar proximity detection and wireless communication, instead of additional cameras or sensors. For example, a local oscillator circuit within the wireless transceiver can generate one or more reference signals that enable both proximity detection and wireless communication. By actively measuring a range to an object, a surrounding environment can be continually monitored and the transmission parameter can be adjusted to account for movement by the object, enabling the wireless transceiver to meet guidelines promulgated by the government or the wireless industry, such as the MPE.

In some examples, an electronic device can transmit a radar waveform during one or more slots of a radio frame, for example, during a slot reserved for a random access channel (RACH) procedure. As such, the electronic device can periodically perform radar proximity detection during certain RACH slots. However, because the radar proximity detection necessarily requires simultaneous transmission and reception, uplink RACH transmissions from other electronic devices can jam the radar detector and reduce the effectivity of proximity-detection. Thus, methods for detecting and avoiding signaling from other electronic devices would enhance the electronics device's ability to actively detect objects and adjust transmission of mmW signals to meet safety guidelines promulgated by the government or the wireless industry.

Example Radar Transmissions

Radio detection and ranging (radar) is a complementary technology to wireless communication, and can be utilized to enhance public safety and the wireless communication experience. Radar uses electromagnetic waveforms to detect objects and determine information such as its relative speed and location. As noted above, radar can be used to enhance public safety.

Figure 4:
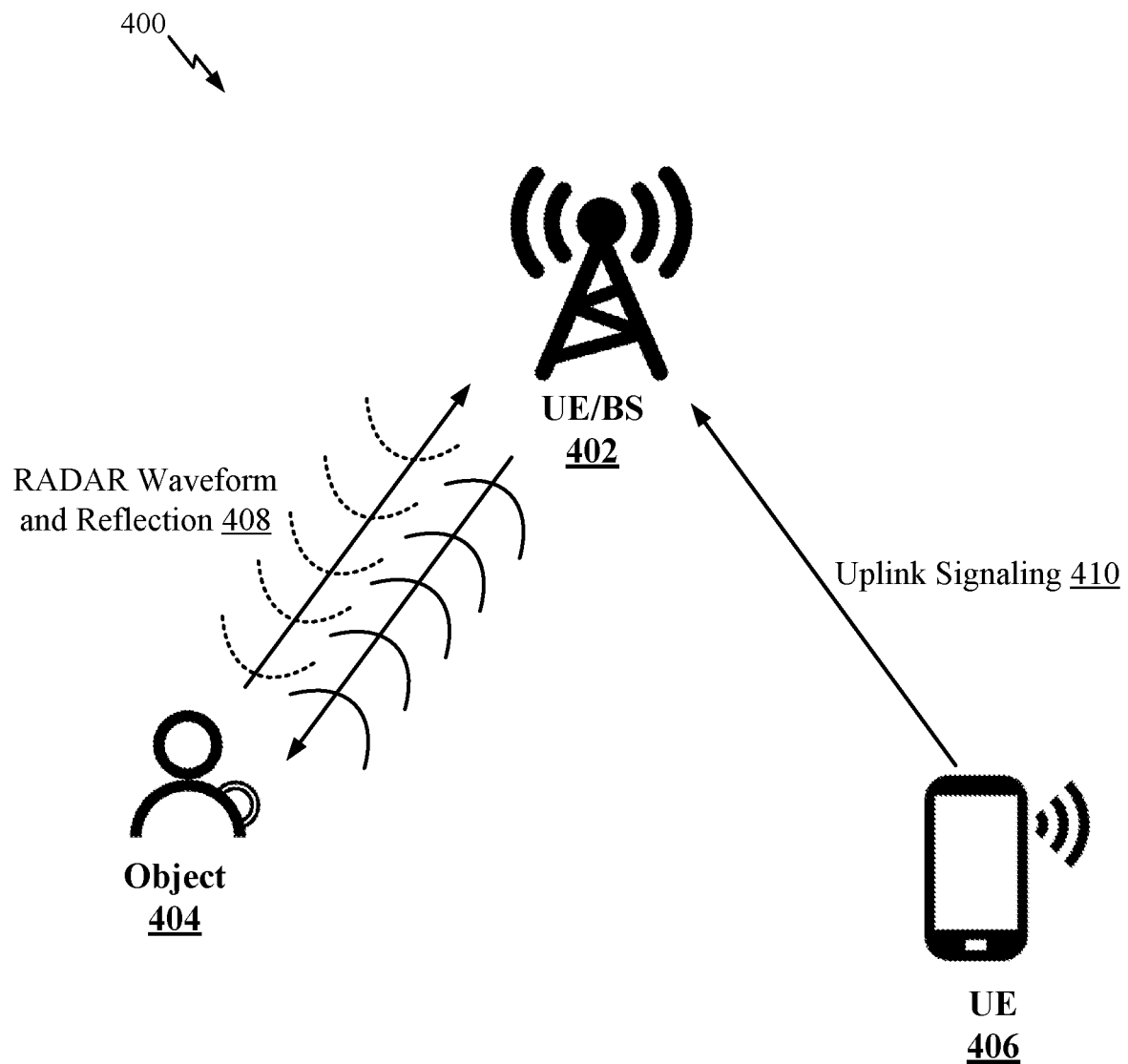
FIG. 4 is a diagram illustrating a communication network utilizing a radar waveform and uplink wireless communication signaling, in accordance with certain aspects of the present disclosure.

FIG. 4 is a diagram illustrating a communication network 400 utilizing a radar waveform and uplink wireless communication signaling. FIG. 4 shows a wireless communication device 402 (e.g., user equipment (UE) 120a or base station (BS) 110*a* of FIGS. 1 and 2) performing radar proximity detection by transmitting a radar waveform 408 and receiving the reflection of the waveform off of an object 404. FIG. 4 also shows the wireless communication device 402 receiving or detecting an uplink signal 410 transmitted from a UE 406 for, in one example, initiating a RACH procedure. In some examples, the UE 406 may be a UE 120 shown in FIG. 1.

For a stationary ranging radar system (e.g., a radar system on the wireless communication device 402), distance (D)=½ the time delay between the transmitted and received radar waveform times the speed of the radar waveform (which may be approximated as $3 \times 10^8$ m/s or (C)). Transmitters and receivers (e.g., transceivers 232*a*-232*t* or 254*a*-254*r* of FIG. 2) can use the same antenna, or groups of antennas (e.g., antennas 234*a*-234*t* or 252*a*-252*r* of FIG. 2), and use circuitry such as a duplexer to control input and output operation. In certain aspects, it is impractical to use single pulse radar systems, as it will be appreciated that for a ten meter target, the time delay is less than 1/10 of a microsecond $[(2*10)/(3*10^8)=66$ nanoseconds]. Thus, another approach to radar detection is to use a continuous wave (CW) radar waveform.

Unmodulated CW (UM-CW) radar detection systems transmit a radar waveform at a constant frequency and use any change in frequency in the received radar waveform to determine the speed of an object. UM-CW radar is not typically used to provide range as stationary objects do not generate a frequency change in the received radar waveform. UM-CW radar is commonly used in sports, for example to determine the speed of a baseball or a racecar.

To obtain more information, frequency modulated CW (FM-CW) radar may be used. In general, a frequency of the FM-CW signal (e.g., radar waveform 408 of FIG. 4) increases or decreases across a time interval. Different types of frequency modulations may be used, including linear-frequency modulations (LFM) (e.g., chirp), sawtooth-frequency modulations, triangular-frequency modulations, and so forth. The FM-CW signal can be generated using existing components within the wireless transceiver 232*a*-232*t* or 254*a*-254*r*. The FM-CW signal enables radar-based ranging techniques to be utilized to determine the range to an object 404. To achieve a finer range resolution (e.g., on the order of centimeters (cm)) for close-range applications, larger bandwidths can be utilized, such as 1 gigahertz (GHz), 4 GHz, 8 GHz, and so forth. For instance, the FM-CW signal can have a bandwidth of approximately 4 GHz and include frequencies between approximately 26 and 30 GHz. The finer range resolution improves range accuracy and enables one or more objects 404 to be distinguished in range. The FM-CW signal can provide an accurate range measurement for a variety of distances based on the bandwidth (e.g., between approximately 4 and 20 cm for a 4 GHz bandwidth). While the FM-CW signal can be used to measure significant ranges, it should be noted that the FM-CW signal can measure ranges between approximately 0 and 150 cm. An amount of time for performing proximity detection can also be relatively short using the FM-CW signal, such as within approximately one microsecond.

The wireless communication device 402 may be configured to utilize the radar waveform 408 to detect the presence of an object 404 (e.g., human) up to 150 cm from the wireless communication device 402. The wireless communication device 402 may perform the object 404 detection process to determine an appropriate transmit power that depend on whether an object 404 is detected, and the proximity of a detected object to the wireless communication device 402. In the case that the wireless communication device 404 is a BS (e.g., BS 110*a*), the BS 110*a* may be configured to have a maximum permitted exposure (MPE) range of 150 cm from a radiating element (e.g., antenna 234*a*-234*t*) for transmitting at 55 dBm. That is, the BS 110*a* may be configured to detect a proximity of an object 404 relative to the BS 110*a*, and if the object is within 150 cm of the radiating element, the BS 110*a* will not transmit over 55 dBm.

Similarly, in the case that the wireless communication device 404 is a UE (e.g., UE 120*a*), the UE 120*a* may be configured to have a maximum permitted exposure (MPE) range of 15 cm from a radiating element (e.g., antenna 252*a*-252*r*) for transmitting at 32 dBm. That is, the UE 120*a* may be configured to detect a proximity of an object 404 relative to the UE 120*a*, and if the object is within 15 cm of the radiating element, the UE 120*a* will not transmit over 32 dBm.

Figure 5A:
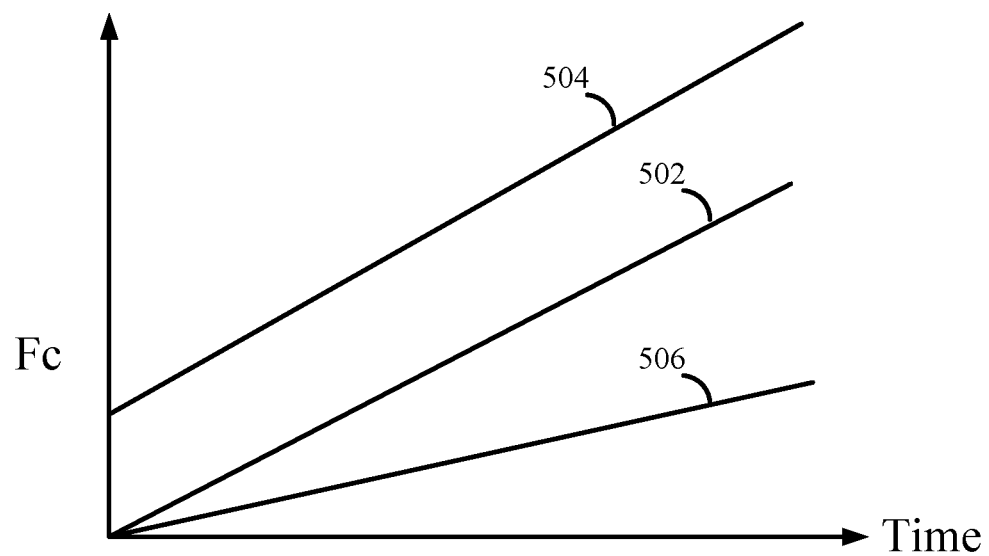
FIGS. 5A and 5B depict three frequency modulated continuous wave (FM-CW) radar waveforms (or chirps) on a frequency-time scale, and a chirp on an amplitude-time scale, in accordance with certain aspects of the present disclosure.

FIG. 5A depicts three FM-CW radar waveforms (or chirps) on a frequency-time scale. Chirp 502 has a first slope with its frequency originating at (Fc) of zero (or zero offset). Chirp 504 has the same slope as chirp 502 and a positive (Fc) offset. Chirp 506 has a zero offset and a second slope that is lower than the first slope of chirp 502 (lower frequency delta for the same time delta).

Figure 5B:
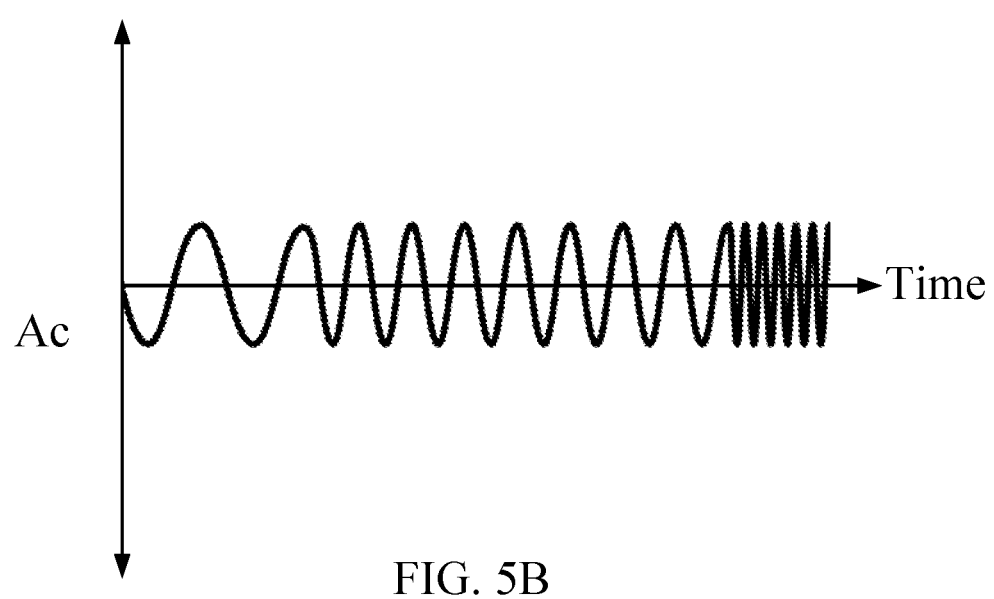

FIG. 5B depicts chirp 502 from FIG. 5A on an amplitude-time scale wherein the amplitude (Ac) oscillations increase in frequency over the chirp time. It will be appreciated that in certain aspects, the phase of the chirp may be controlled to provide a desired phase. When an FM-CW chirp is received, it may experience both a change in frequency and a time delay, and therefore can be used to simultaneously measure the relative range (e.g., using the time delay) and the velocity (e.g., using the frequency change) of an object from the radar detection system.

Figure 6:
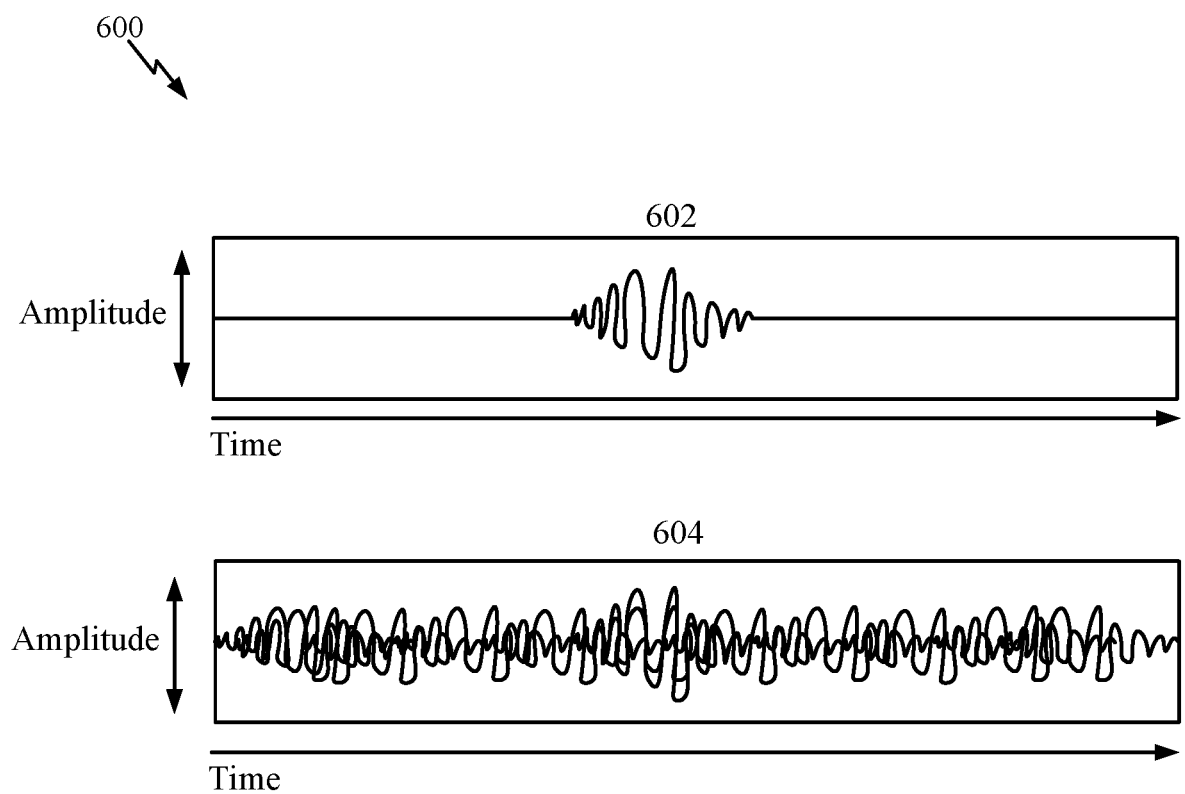
FIG. 6 shows two graphs representative of an object detected by one or more radar waveforms, in accordance with certain aspects of the present disclosure.

FIG. 6 shows two graphs 600 representative of an object detected by one or more radar waveforms. Radar waveform 602 depicts detecting an object with a single chirp in an environment free from interference. The signal-to-noise ratio is ideal as the noise is shown as zero. It will be appreciated that environments are rarely free from interference. For example, radar waveform 604 depicts detecting an object with a single chirp in an environment with relatively high interference and/or high powered signaling from other sources. For example, if the wireless communication device 402 of FIG. 4 receives the radar waveform 408 reflection indicating the object 404 signaling at the same time the UE 406 transmits an uplink signal, the radar waveform 408 reflection may appear similar to the radar waveform 604. It will be appreciated that the signal to noise ratio is poor because the interference is high making object detection poor. Such environments may impede object detection, and/or jam the radar waveform.

Example Radar-Based Target Detection and Interference Avoidance

Figure 7:
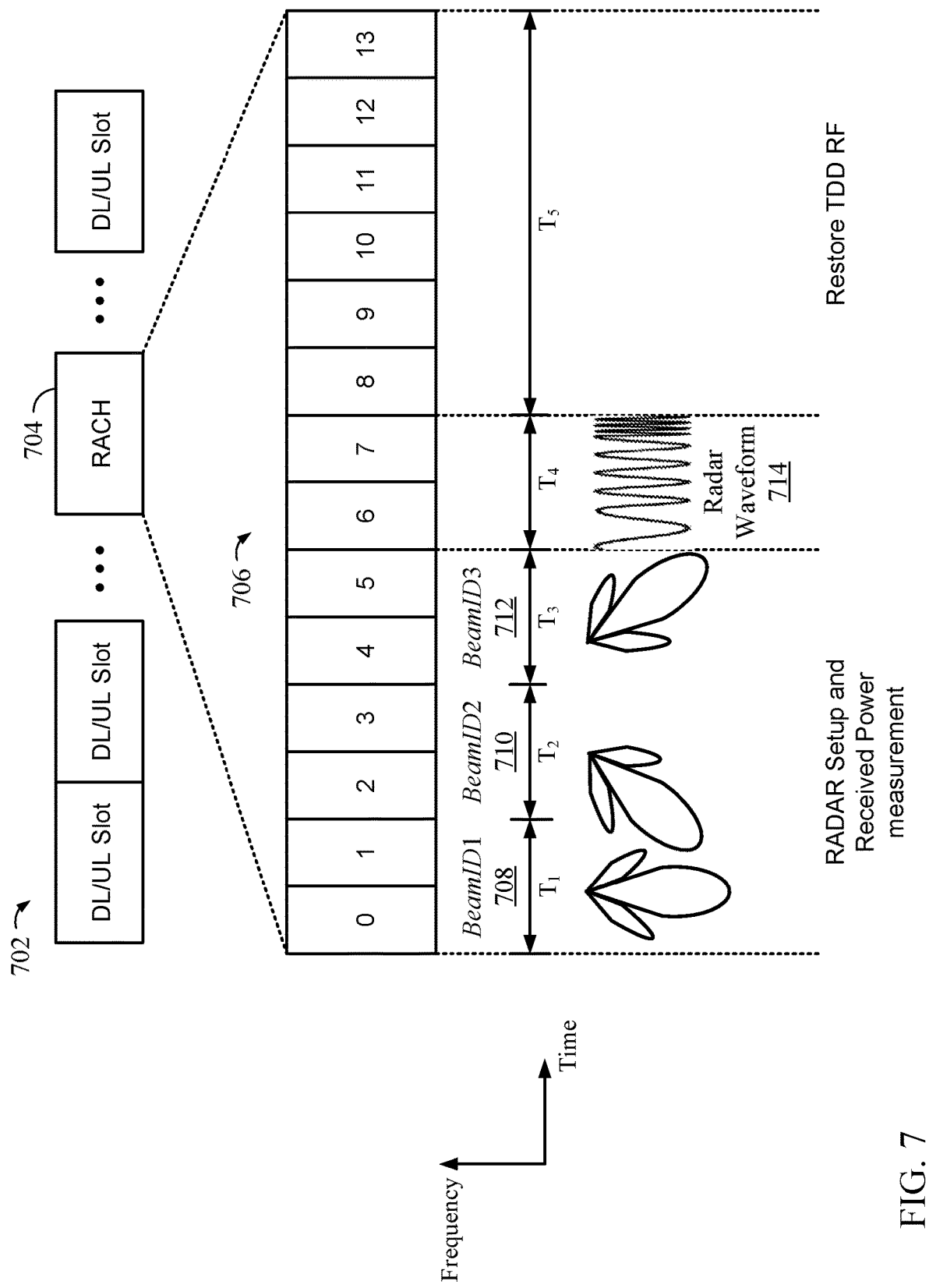
FIG. 7 is a block diagram illustrating an example of using receive-beam beamforming for noise measurement prior to performing radar proximity detection, in accordance with certain aspects of the present disclosure.

FIG. 7 is a block diagram illustrating an example of using receive-beam beamforming for noise measurement prior to performing radar proximity detection by a BS (e.g., BS 110*a* of FIGS. 1 and 2) or a UE (e.g., UE 120*a* of FIG. 1). FIG. 7 shows a series of contiguous slots 702 (e.g., similar to the slots illustrated in FIG. 3) used for wireless communication over an air interface between the BS and the UE.

In this example, the wireless communication may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless communication, a full duplex channel generally relies on physical isolation of a transmitter and receiver, and suitable interference cancellation technologies. Full duplex emulation is frequently implemented for wireless communication by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly (e.g., several times per slot).

In certain aspects, the series of slots 702 may be communicated using a TDD carrier. As such, the series of slots 702 may include a series of uplink and downlink slots, as well as a periodic random access channel (RACH) slot 704. The RACH is a shared channel that may be used by the BS 110a and UE 120a to initiate access to a mobile network (e.g., TDMA/FDMA, and CDMA based network) for call set-up and data transmission. In certain aspects, the BS 110a or UE 120a may utilize the RACH slot 704 to measure noise and received power over the air interface, as well as to transmit a radar waveform and receive a reflection of the radar waveform.

As noted above, a slot may include a number of symbol periods. In this example, the RACH slot 704 includes a set of symbols 706 having 14 symbols. In certain aspects, the BS 110a may dedicate a variable number of symbols in the beginning of the set of symbols 706 of the RACH slot 704 to measuring noise and/or power in the air interface in various directions. For example, the BS 110a or UE 120a may utilize a plurality of receive-beams (708, 710, 712) to measure power received at each beam, wherein the direction of each receive-beam is different than other beams in the plurality of receive-beams (708, 710, 712). In some examples, each receive-beam includes a beam ID (e.g., BeamID1, BeamID2, BeamID3) indicative of the direction of the beam.

For example, the BS 110a or UE 120a may receive and measure power from the plurality of directional receive-beams (708, 710, 712) at the beginning of the RACH slot 704, wherein each of the plurality of receive-beams (708, 710, 712) has a beam ID (e.g., BeamID1, BeamID2, BeamID3) and is characterized by an azimuth angle offset relative to the other receive-beams. As shown in FIG. 7, a first receive-beam 708 (BeamID1) is generated by the BS 110a or UE 120a during a first two contiguous symbols (e.g., symbols 0 and 1) of the RACH slot having a duration of $T_1$. The BS 110a or UE 120a may configure the first receive-beam 708 so that the direction of the beam is directed at a zero degree (0°) perpendicular angle relative to the transceiver generating the beam. Following the first receive-beam 708, the BS 110a or UE 120a may generate a second receive-beam 710 (BeamID2) during a second two contiguous symbols (e.g., symbols 2 and 3) of the RACH slot 704 having a duration of $T_2$. The BS 110a or UE 120a may configure the second receive-beam 710 so that the direction of the beam is at a forty-five degree (45°) azimuth angle relative to the first receive-beam 708. Then, following the second receive-beam 710, the BS 110a or UE 120a may generate a third receive-beam 712 (BeamID3) during a third two contiguous symbols (e.g., symbols 4 and 5) of the RACH slot having a duration of $T_3$. The BS 110a or UE 120a may configure the first receive-beam so that the direction of the beam is at a negative forty-five degree)(−45° azimuth angle relative to the first receive-beam. It should be noted that the BS 110a or UE 120a may use any suitable angle for directing the plurality of receive-beams (708, 710, 712).

During the time that the BS 110a or UE 120a is generating the receive-beams (708, 710, 712), the BS 110a or UE 120a may be configuring a local oscillator (LO) circuit (e.g., an LO circuit in one or more of transceivers 232a-232t or 254a-254r of FIG. 2) for transmission of a radar waveform 714.

In certain aspects, the BS 110a or UE 120a may measure received power and calculate a rise over thermal (RoT) for each of the plurality of receive-beams (708, 710, 712). In this example, the BS 110a or UE 120a measures the received power at each of the plurality of receive-beams during the RACH slot 704, wherein each of the plurality of receive-beams is measured contiguously (e.g., in series) and for a duration of at least two symbols. The BS 110a or UE 120a measures power corresponding to interference, or noise, in the air interface, as well as potentially signaling from other network entities (e.g., UE 120 and/or BS 110) in the vicinity. For example, if another UE 120 attempts to initiate a RACH procedure for establishing a cell connection with the BS 110a during the RACH slot 704, the BS 110a or UE 120a may measure a relatively high level of power from one or more of the plurality of receive-beams (708, 710, 712) if one or more of the beams intercept a RACH preamble (Msg 1) transmitted by the other UE 120.

The BS 110a or UE 120a may then calculate the RoT for each of the plurality of receive-beams (708, 710, 712) based on the measured power associated with each beam and a configurable baseline noise power value stored on the BS 110a or UE 120a. In some examples, the RoT may represent a power-to-interference ratio calculated using the following equation:

$$RoT_x = \frac{R_xPwr}{NoisePwr} \qquad \text{Equation 1}$$

Where $R_xPwr$ corresponds to the measured power of one of the plurality of beams (708, 710, 712), where x identifies which of the plurality of beams the measurement corresponds to, and where NoisePwr corresponds to the configurable baseline noise power value stored on the BS 110a or UE 120a.

In some examples, the baseline noise-power value indicates a ceiling power or noise level in the air interface that the BS 110a or UE 120a can tolerate for purposes of transmitting a radar waveform and receiving a reflection of the waveform. In such an example, the calculated RoT may indicate whether the measured power of each of the plurality of receive-beams satisfies a threshold condition. For example, if the RoT value of one of the receive-beams (708, 710, 712) is greater than 1 (e.g., a configurable number such as 10, or any number greater than 2), the BS 110a or UE 120a may determine that the threshold condition is not satisfied because the measured power is greater than the baseline noise-power value. In this example, the BS 110a or UE 120a may determine not to transmit a radar waveform in the same direction as that receive-beam. Instead, the BS 110a or UE 120a may determine to transmit the radar waveform in a same direction as another receive-beam having an RoT value that is close to 1 (e.g., an RoT value between 1 and 2). Alternatively, if the RoT value of one of the receive-beams (708, 710, 712) is close to 1 (e.g., an RoT value between 1 and 2), the BS 110a or UE 120a may determine that the threshold condition is satisfied because the measured power is within range of the baseline noise-power value. In this example, the BS 110a or UE 120a may determine to transmit a radar waveform in the same direction as that receive-beam.

Accordingly, if the measured power received at one or more of the plurality of receive-beams (708, 710, 712) satisfies the threshold condition, then the BS 110a or UE 120a may select a convenient directional transmit beam with low interference relative to other beams in the plurality of receive-beams (708, 710, 712), where the direction of the transmit beam is based on a direction of one of the one or more of the plurality of receive-beams that satisfy the threshold condition. In certain aspects, the BS 110a or UE 120a selects the directional transmit beam by determining which of the plurality of receive-beams is associated with the lowest measured power relative to the other of the plurality of receive-beams (708, 710, 712). For example, if the first receive-beam 708 has one or more of the lowest calculated RoT or the lowest measured power relative to the other receive-beams, then the BS 110a or UE 120a may select a directional transmit beam for transmitting the radar waveform, wherein the direction of the transmit beam is the same as the direction of the first receive-beam 708.

It should be noted that in certain aspects, the direction of the transmit beam may be based on a direction of two or more of the plurality of receive-beams that satisfy the threshold condition. For example, the BS 110a or UE 120a may utilize a broader directional beam to transmit the radar waveform such that the radar waveform extends over the direction of two or more of the plurality of receive-beams (708, 710, 712). In certain aspects, if each of the plurality of receive-beams does not satisfy the threshold condition, then the BS 110a or UE 120a may forego transmitting the radar waveform 714, and instead, wait until the next RACH slot to make another set of measurements over the plurality of receive-beams (708, 710, 712), or a different set of receive-beams having a different set of directions.

Thus, based on the calculated RoT, the BS 110a or UE 120a may determine to transmit a radar waveform 714 during one or more symbols (e.g., symbols 6 and 7) in the RACH slot 704 during time $T_4$. In certain aspects, the radar waveform 714 may be transmitted using a selected directional transmit beam, wherein the direction of the selected transmit beam is based on the direction of one or more of the plurality of receive-beams that have a measured power that satisfies the threshold condition. In this way, the reflection of the radar waveform that is transmitted is not "lost" in the noise, or jammed by the ambient signals in the air interface.

Once the radar waveform 714 is transmitted, the BS 110a or UE 120a may restore the transceiver function to an RF functionality that supports TDD carrier communication.

Figure 8:
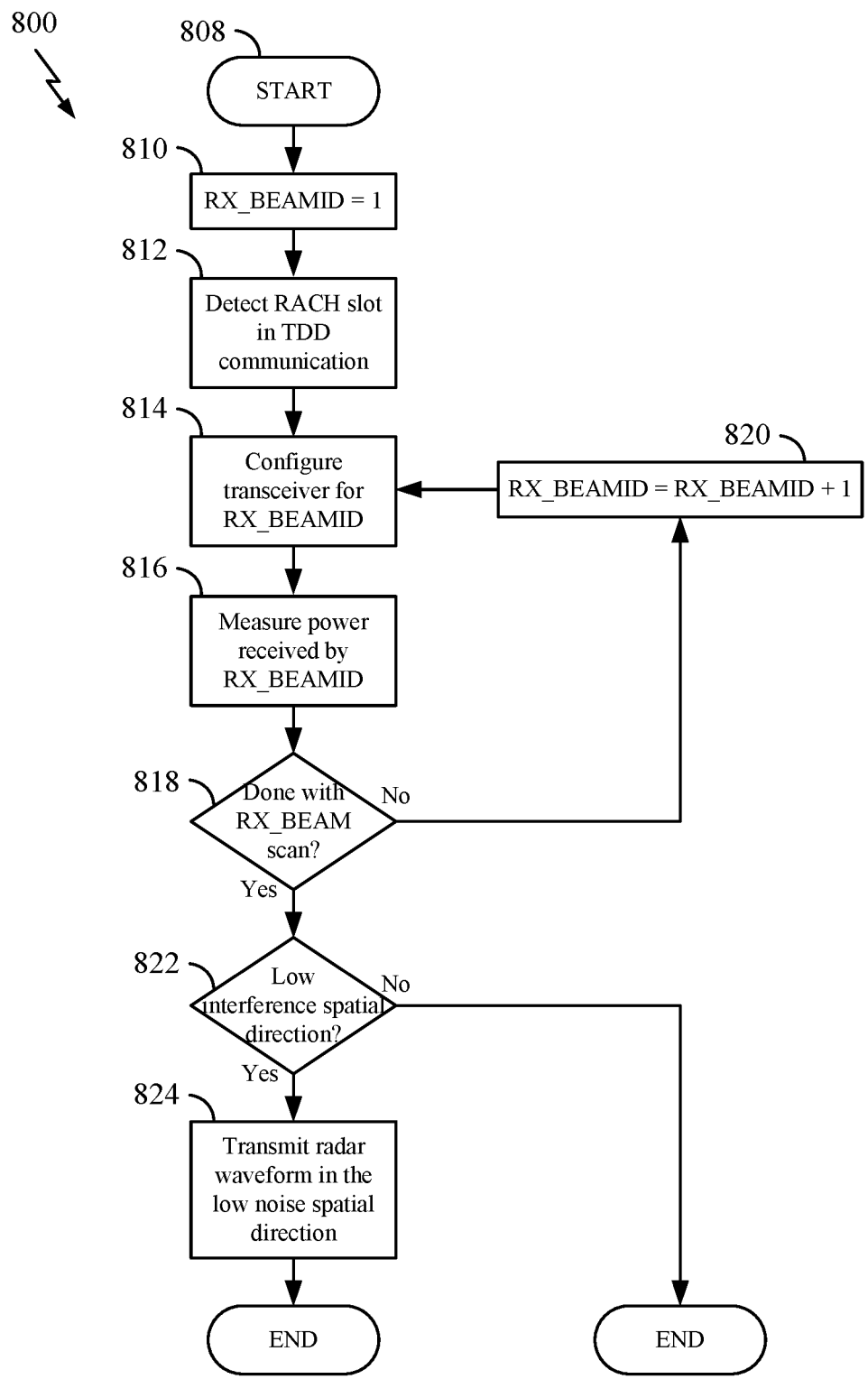
FIG. 8 is a flow diagram illustrating example operations for spatial sensing and detection of uplink interference, in accordance with certain aspects of the present disclosure.

FIG. 8 is a flow diagram illustrating example operations 800 for spatial sensing and detection of uplink interference, in accordance with certain aspects of the present disclosure. In some examples, the operations 800 may be performed by a BS 110a or UE 120a, and may start 808 at each RACH slot of a TDD communication carrier.

At a first step 810, the operations 800 may initialize with a first receive-beam ID. The first receive-beam ID may correspond to a directional receive-beam at the BS 110a that has a first direction.

At a second step 812, the operations 800 may detect a RACH slot in the TDD communication. For example, the BS 110a may detect a RACH slot based on a schedule or pattern of RACH slots.

At a third step 814, the BS 110a or UE 120a may configure a transceiver for a receive-beam having a particular direction. For example, at the start of the RACH slot, the BS 110a may configure the transceiver for a first directional receive-beam. After a power measurement is received using the first directional receive-beam, the BS 110a or UE 120a may configure the transceiver for a second directional receive-beam.

At a fourth step 816, the BS 110a or UE 120a may measure power received by the directional receive-beam. For example, the BS 110a or UE 120a may use the directional receive-beam to determine how much power is ambient in the air interface in a particular direction.

At a fifth step 818, the BS 110a or UE 120a may determine whether the receive-beam scan is complete. For example, the BS 110a or UE 120a may be configured to generate two or more receive-beams during a single RACH slot to measure ambient power in the air interface in two or more particular directions. If the beam scan is not complete, then the operations 800 proceed to a sixth step 820, where the transceiver is configured for the next receive-beam. If the beam scan is complete, meaning that the two or more receive-beams have been generated, and a power measurement of the air interface in directions corresponding to each beam has been measured, the operations 800 proceed to a seventh step 822, where the BS 110a or UE 120a determines if a power value corresponding to a power measurement of the two or more receive-beams satisfies a threshold condition. In some examples, if a power measurement satisfies the threshold condition, the operations proceed to an eighth step 824, where the BS 110a or UE 120a transmits a radar waveform in a direction corresponding to a receive-beam having the power measurement that satisfies the threshold condition. Alternatively, if none of the power measurements of each of the receive-beams satisfy the threshold condition, then the BS 110a or UE 120a may not transmit a radar waveform.

Figure 9:
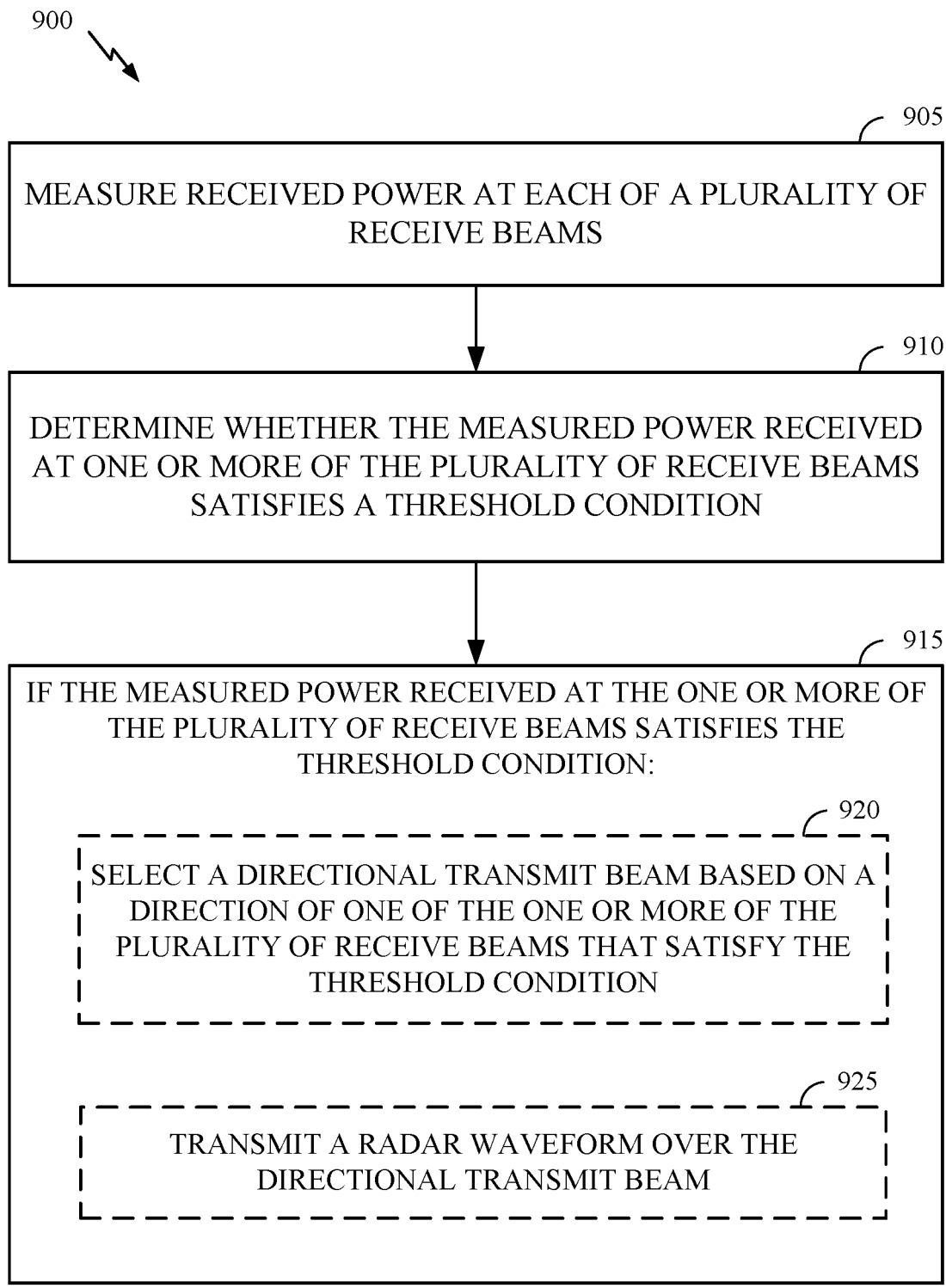
FIG. 9 is a flow diagram illustrating example operations for wireless communication, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as the BS 110a in the wireless communication network 100) or a UE (e.g., such as the UE 120a in the wireless communication network 100). Operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 may begin, at a first step 905, by measuring received power at each of a plurality of receive-beams.

The operations 900 then proceed to a second step 910, by determining whether the measured power received at one or more of the plurality of receive-beams satisfies a threshold condition.

The operations 900 then proceed to a third step 915, wherein if the measured power received at the one or more of the plurality of receive-beams satisfies the threshold condition, the operations then proceed to a fourth step 920 and a fifth step 925. In the fourth step 920, the operations 900 include selecting a directional transmit beam based on a direction of one of the one or more of the plurality of receive-beams that satisfy the threshold condition. In the fifth step 925, the operations 900 include transmitting a radar waveform over the directional transmit beam.

In certain aspects, selecting the directional transmit beam further comprises determining which of the one or more of the plurality of receive-beams, having measured power that satisfies the threshold condition, is associated with the lowest measured power relative to the other of the one or more of the plurality of receive-beams, wherein the selected directional transmit beam has the same direction as the receive-beam having the lowest measured power relative to the other of the one or more of the plurality of receive-beams.

In certain aspects, each of the plurality of receive-beams is characterized by an azimuth offset relative to the other receive-beams.

In certain aspects, the operations 900 further comprise measuring the received power at each of the plurality of receive-beams during a single slot, wherein each of the plurality of receive-beams is measured contiguously and for a duration of at least two symbols.

In certain aspects, the single slot is a random access channel (RACH) slot in a time division duplex (TDD) carrier.

In certain aspects, the operations 900 further comprise, if the measured power received at the one or more of the plurality of receive-beams does not satisfy the threshold condition, measuring received power at each of the plurality of receive-beams during a next RACH slot.

In certain aspects, the single slot comprises a plurality of symbols. In certain aspects, the plurality of receive-beams comprise at least a first receive-beam and a second receive-beam, wherein the first receive-beam has a duration of a first two symbols of the plurality of symbols, and wherein the second receive-beam has a duration of a second two symbols of the plurality of symbols. In certain aspects, the directional transmit beam has a duration of a third two symbols of the plurality of symbols.

In certain aspects, measuring received power at each of the plurality of receive-beams comprises measuring a power-to-interference ratio at each of the plurality of receive-beams.

Figure 10:
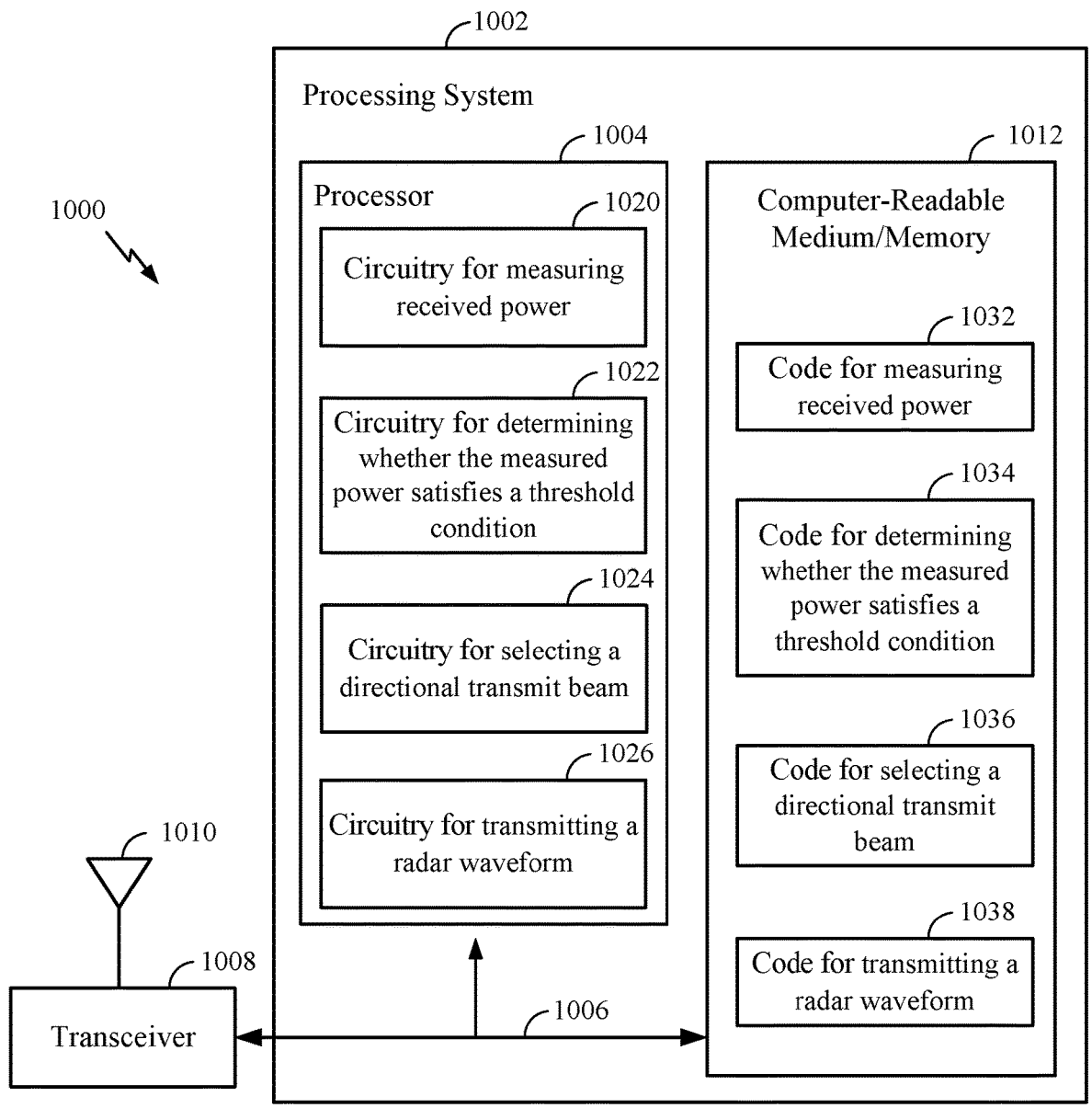
FIG. 10 illustrates a communications device that may include various components (e.g., corresponding to means-plus-function components) configured to perform operations for the techniques disclosed herein, such as the operations illustrated in FIGS. 8 and 9.

FIG. 10 illustrates a communications device 1000 that may include various components (e.g., corresponding to means-plus-function components) configured to perform operations for the techniques disclosed herein, such as the operations illustrated in FIGS. 8 and 9. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIGS. 8 and 9, or other operations for performing the various techniques discussed herein for spatial sensing and avoiding interference for transmitting a radar waveform. In certain aspects, computer-readable medium/memory 1012 stores code 1032 for measuring received power at each of a plurality of receive-beams; code 1034 for determining whether the measured power received at one or more of the plurality of receive-beams satisfies a threshold condition; code 1036 for selecting a directional transmit beam based on a direction of one of the one or more of the plurality of receive-beams that satisfy the threshold condition; and code 1038 for transmitting a radar waveform over the directional transmit beam. In certain aspects, the processor 1020 has circuitry configured to implement the code stored in the computer-readable medium/memory 1012. The processor 1004 includes circuitry 1020 for measuring received power at each of a plurality of receive-beams; circuitry 1022 for determining whether the measured power received at one or more of the plurality of receive-beams satisfies a threshold condition; circuitry 1024 for selecting a directional transmit beam based on a direction of one of the one or more of the plurality of receive-beams that satisfy the threshold condition; and circuitry 1026 for transmitting a radar waveform over the directional transmit beam.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, customer premises equipment (CPE), or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8 and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of detecting interference by a network entity, comprising:
    measuring, during a single slot, received power at each of a plurality of receive-beams;
    determining whether the measured power received at one or more of the plurality of receive-beams satisfies a threshold condition;
    if the measured power received at the one or more of the plurality of receive-beams satisfies the threshold condition:
        selecting a directional transmit-beam based on a direction of one of the one or more of the plurality of receive-beams that satisfy the threshold condition; and
        transmitting, during the single slot, a radar waveform over the directional transmit-beam.

2. The method of claim 1, wherein selecting the directional transmit-beam further comprises determining which receive-beam of the one or more of the plurality of receive-beams, having measured power that satisfies the threshold condition, is associated with a lowest measured power among the one or more of the plurality of receive-beams, wherein the selected directional transmit-beam has a same direction as the receive-beam having the lowest measured power among the one or more of the plurality of receive-beams.

3. The method of claim 1, wherein each of the plurality of receive-beams is characterized by an azimuth offset relative to another of the plurality of receive-beams.

4. The method of claim 1, wherein each of the plurality of receive-beams is measured contiguously and for a duration of at least two symbols.

5. The method of claim 1, wherein the single slot is a random access channel (RACH) slot in a time division duplex (TDD) carrier.

6. The method of claim 1, further comprising, if the measured power received at the one or more of the plurality of receive-beams does not satisfy the threshold condition, measuring received power at each of the plurality of receive-beams during a different slot.

7. The method of claim 1, wherein:
    the single slot comprises a plurality of symbols;
    the plurality of receive-beams comprise at least a first receive-beam and a second receive-beam, wherein the first receive-beam has a first duration of a first two symbols of the plurality of symbols, and wherein the second receive-beam has a second duration of a second two symbols of the plurality of symbols; and
    the directional transmit-beam has a third duration of a third two symbols of the plurality of symbols.

8. The method of claim 1, wherein measuring received power at each of the plurality of receive-beams comprises measuring a power-to-interference ratio at each of the plurality of receive-beams.

9. The method of claim 1, wherein the network entity is a base station (BS) or a user equipment (UE).

10. A network entity configured to detect interference over an air interface, comprising:
    a memory; and
    a processor, wherein the processor is communicatively coupled to the memory and configured to:
        measure, during a single slot, received power at each of a plurality of receive-beams;
        determine whether the measured power received at one or more of the plurality of receive-beams satisfies a threshold condition;
        if the measured power received at the one or more of the plurality of receive-beams satisfies the threshold condition, the processor is further configured to:
            select a directional transmit-beam based on a direction of one of the one or more of the plurality of receive-beams that satisfy the threshold condition; and transmit, during the single slot, a radar waveform over the directional transmit-beam.

11. The network entity of claim 10, wherein the processor, being configured to select the directional transmit-beam, is further configured to:
determine which receive-beam of the one or more of the plurality of receive-beams, having measured power that satisfies the threshold condition, is associated with a lowest measured power among the one or more of the plurality of receive-beams, wherein the selected directional transmit-beam has a same direction as the receive-beam having the lowest measured power among the one or more of the plurality of receive-beams.

12. The network entity of claim 10, wherein each of the plurality of receive-beams is characterized by an azimuth offset relative to another of the plurality of receive-beams.

13. The network entity of claim 10, wherein each of the plurality of receive-beams is measured contiguously and for a duration of at least two symbols.

14. The network entity of claim 10, wherein the single slot is a random access channel (RACH) slot in a time division duplex (TDD) carrier.

15. The network entity of claim 10, wherein if the measured power received at the one or more of the plurality of receive-beams does not satisfy the threshold condition, the processor is further configured to measure received power at each of the plurality of receive-beams during a different slot.

16. The network entity of claim 10, wherein:
the single slot comprises a plurality of symbols;
the plurality of receive-beams comprise at least a first receive-beam and a second receive-beam, wherein the first receive-beam has a first duration of a first two symbols of the plurality of symbols, and wherein the second receive-beam has a second duration of a second two symbols of the plurality of symbols; and
the directional transmit-beam has a third duration of a third two symbols of the plurality of symbols.

17. The network entity of claim 10, wherein measuring received power at each of the plurality of receive-beams comprises measuring a power-to-interference ratio at each of the plurality of receive-beams.

18. The network entity of claim 10, wherein the network entity is a base station (BS) or a user equipment (UE).

19. An apparatus for detecting interference, comprising:
means for measuring, during a single slot, received power at each of a plurality of receive-beams;
means for determining whether the measured power received at one or more of the plurality of receive-beams satisfies a threshold condition;
if the measured power received at the one or more of the plurality of receive-beams satisfies the threshold condition:
means for selecting a directional transmit-beam based on a direction of one of the one or more of the plurality of receive-beams that satisfy the threshold condition; and
means for transmitting, during the single slot, a radar waveform over the directional transmit-beam.

20. The apparatus of claim 19, further comprising:
means for determining which receive-beam of the one or more of the plurality of receive-beams, having measured power that satisfies the threshold condition, is associated with a lowest measured power among the one or more of the plurality of receive-beams, wherein the selected directional transmit-beam has a same direction as the receive-beam having the lowest measured power among the one or more of the plurality of receive-beams.

21. The apparatus of claim 19, wherein each of the plurality of receive-beams is characterized by an azimuth offset relative to another of the plurality of receive-beams.

22. The apparatus of claim 19, wherein each of the plurality of receive-beams is measured contiguously and for a duration of at least two symbols.

23. The apparatus of claim 19, wherein the single slot is a random access channel (RACH) slot in a time division duplex (TDD) carrier.

24. The apparatus of claim 19, further comprising, if the measured power received at the one or more of the plurality of receive-beams does not satisfy the threshold condition, means for measuring received power at each of the plurality of receive-beams during a different slot.

25. The apparatus of claim 19, wherein:
the single slot comprises a plurality of symbols;
the plurality of receive-beams comprise at least a first receive-beam and a second receive-beam, wherein the first receive-beam has a first duration of a first two symbols of the plurality of symbols, and wherein the second receive-beam has a second duration of a second two symbols of the plurality of symbols; and
the directional transmit-beam has a third duration of a third two symbols of the plurality of symbols.

26. The apparatus of claim 19, wherein the means for measuring received power at each of the plurality of receive-beams comprises means for measuring a power-to-interference ratio at each of the plurality of receive-beams.

27. A non-transitory computer readable storage medium that stores instructions that when executed by a processor of an apparatus cause the apparatus to perform a method of detecting interference over an air interface comprising:
measuring, during a single slot, received power at each of a plurality of receive-beams;
determining whether the measured power received at one or more of the plurality of receive-beams satisfies a threshold condition;
if the measured power received at the one or more of the plurality of receive-beams satisfies the threshold condition:
selecting a directional transmit-beam based on a direction of one of the one or more of the plurality of receive-beams that satisfy the threshold condition; and
transmitting, during the single slot, a radar waveform over the directional transmit-beam.

28. The non-transitory computer readable storage medium of claim 27, wherein the method further comprises determining which receive-beam of the one or more of the plurality of receive-beams, having measured power that satisfies the threshold condition, is associated with a lowest measured power among the one or more of the plurality of receive-beams, wherein the selected directional transmit-beam has a same direction as the receive-beam having the lowest measured power among the one or more of the plurality of receive-beams.

29. The non-transitory computer readable storage medium of claim 27, wherein each of the plurality of receive-beams is characterized by an azimuth offset relative to another of the plurality of receive-beams.

30. The non-transitory computer readable storage medium of claim 27, wherein each of the plurality of receive-beams is measured contiguously and for a duration of at least two symbols.

* * * * *